Dec. 30, 1930.  H. TURNER  1,787,344
INDEX CABINET SLIDE
Filed Jan. 17, 1928  2 Sheets-Sheet 1
Fig. 1.
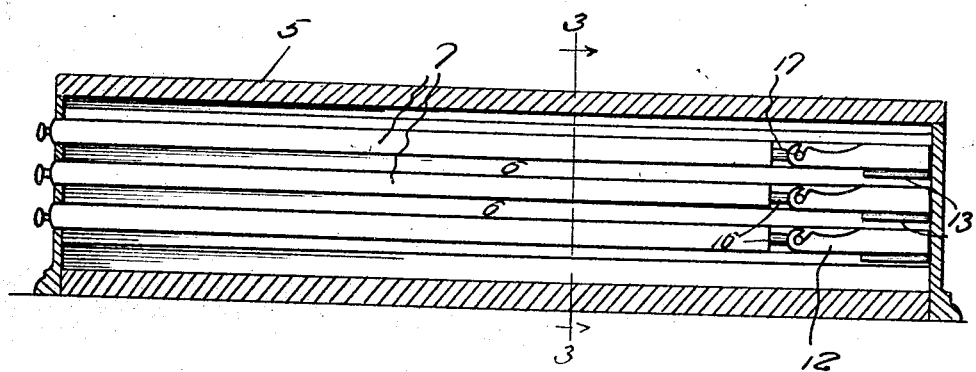
Fig. 2.
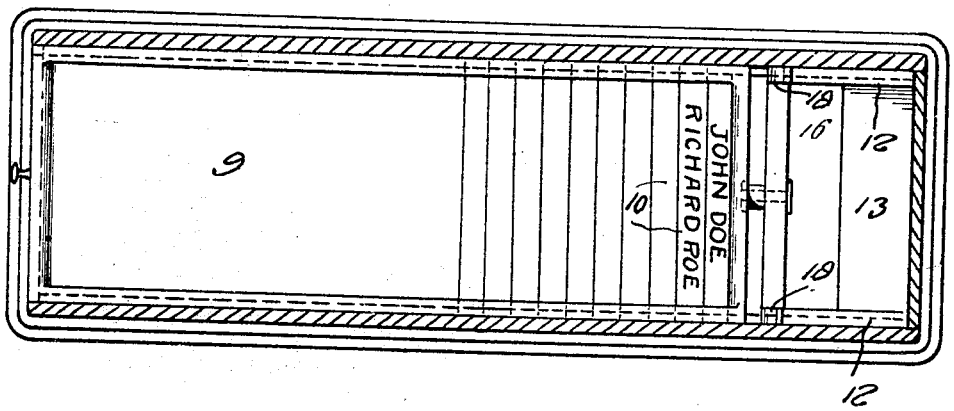
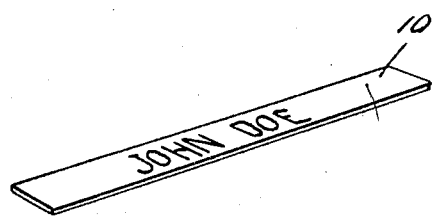
Fig. 7.
Inventor
H. Turner;
By Clarence A. O'Brien
Attorney Dec. 30, 1930.    H. TURNER    1,787,344
INDEX CABINET SLIDE
Filed Jan. 17, 1928    2 Sheets-Sheet 2
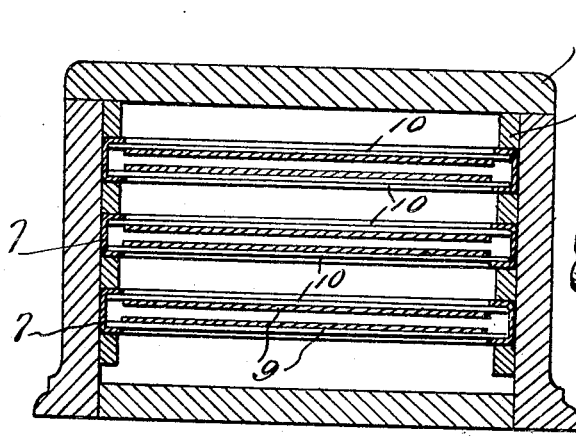
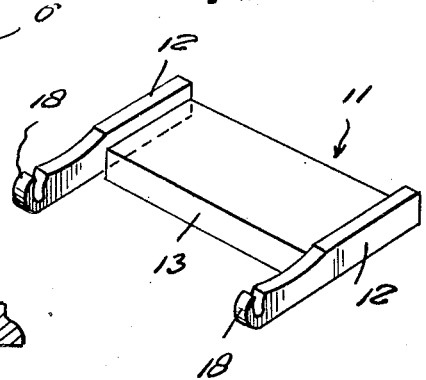
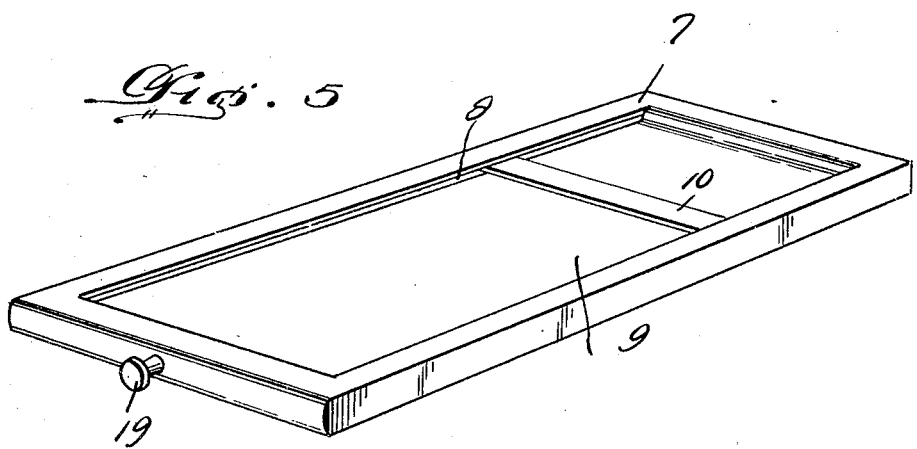
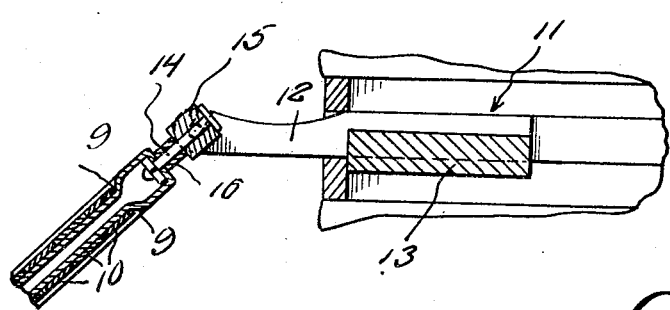
Inventor
H. Turner,
By Clarence A. O'Brien
Attorney Patented Dec. 30, 1930

1,787,344

UNITED STATES PATENT OFFICE

HAL TURNER, OF TULSA, OKLAHOMA

INDEX CABINET SLIDE

Application filed January 17, 1928. Serial No. 247,366.

This invention relates to new and useful improvements in card indexes, and has more particular reference to an improved index card holding slide for disposition within a suitable index cabinet, the primary object of the invention residing in the provision of such a slide that is constructed for receiving index cards on its opposite faces and being further constructed so as to permit the slide to be turned over upon itself after the same has been drawn completely from the cabinet, and suspended from the cabinet by means attached to the inner end of the slide and slidable within the cabinet.

A still further and important object is to provide means whereby the slide could be quickly entirely detached from the cabinet so that the slide can be moved from one desk to another without requiring the entire removal of the index cabinet.

By reason of the present invention, twice the amount of cards can be used as has been possible in index slides now in use, thus conserving space and also time insomuch as a greater number of the index cards may be handled with the handling of but one half the number of the card slides.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate like parts throughout the several views:

Figure 1 is a detail longitudinal section through a generally conventional index cabinet within which is disclosed several of the slides constructed in accordance with the present invention.

Figure 2 is a horizontal section through the cabinet taken at a point directly above one of the slides.

Figure 3 is a detail transverse section on somewhat an enlarged scale and taken substantially upon the line 3—3 of Figure 1.

Figure 4 is a perspective of the member to which the index slide is detachably and swivelly associated and that cooperates with means directly attached to the inner end of the slide to permit the slide to be supported in a hung position.

Figure 5 is a perspective of the slide per se, and

Figure 6 is a somewhat enlarged longitudinal section through the slide and cabinet disclosing the slide as in full outwardly drawn position so that the index cards may be readily handled, and Figure 7 is a perspective of one of the index strips adapted for disposition within the slide.

Now having particular reference to the drawings, 5 designates a generally conventional index cabinet, having arranged upon the inner faces of the side walls thereof spaced longitudinally extending strips 6, those at opposite sides cooperating with each other for providing supports for the index slide presently to be described. The front wall of the cabinet 5 intermediate the said strips 6 are provided with horizontal openings to permit the slides to be moved into and from the cabinet as disclosed in Figures 1 and 6.

It is to be understood that I do not desire to be limited to any particular construction of index cabinet for the reason that my slide structure may be employed in association with varying designs of cabinets without affecting the spirit and scope of the invention. The character of cabinet shown herein is merely by way of illustration, and in order to more clearly disclose the true invention.

The particular slide is designated generally by the reference character 7 and is constructed of sheet metal to provide a relatively elongated and narrow hollow body. Adjacent opposite longitudinal edges of this body the top and bottom walls thereof are slit as at 8, these slits terminating in slight spaced relation with the opposite ends of the body as clearly disclosed in Figure 5. Within the confines of these slits said top and bottom walls are pressed inwardly to provide shallow pockets 9—9 at opposite sides of the body as disclosed in Figure 6.

Celluloid or similar material name strips 10 are provided for arrangement transversely within the pocket at opposite sides of the body as also disclosed in Figure 6. The length of these strips is greater than the width of the pocket so that the opposite ends thereof can be arranged within the slit 8 at opposite longitudinal edges of the pockets with the obvious result that they will be securely arranged therein. Complementary to each of the slides there is provided an attaching member designated generally by the reference character 11. Each slide-attaching member includes a pair of spaced parallel arms 12—12 of suitable material of a width slightly less than the space between the cabinet guide strips 6 and adapted for sliding movement between spaced guide strips at opposite sides of the cabinet as illustrated in Figure 6.

Interconnecting these arms at their inner ends is a cross piece 13, the lower surface of which projects beneath the lower edges of the arms 12—12 so that the forward edge of this cross piece will strike against the front wall of the cabinet 5 directly beneath the opening through which moves that particular index 7. It is preferably that the openings in the front wall of the cabinet 5 be greater than the thickness and width of the arms 12 and cross piece 13 so that when the forward ends of the arms 12 project through the openings an upward rocking movement upon the arms will release the cross piece from the forward wall of the cabinet 5 so that the entire unit 11 may be removed from the cabinet.

Arranged through the center of the inner end wall of each index 7 is a longitudinal bolt or pin 14 upon the outer end of which is swivelly arranged a cross bar 15, the same being spaced from the slide by a spacing collar 16 arranged upon the bolt or pin as disclosed in Figure 6. The opposite ends of said cross bar 15 are formed or equipped with pins 17 while the outer ends of the arms 12—12 of the said unit 11 are formed at their upper edges with curved slots so as to provide hooks 18—18 upon the outer ends of said arms for loosely receiving the pins at the opposite ends of the cross bar 15.

The outer end of each index 7 is equipped with a pull knob 19, and obviously when any one of the index slides is pulled forward until the arms 12—12 of the complementary attaching unit 11 project from the cabinet 5, the slide will hang therefrom so that the indexes may be readily viewed. Furthermore, the reference strips, cards or the like arranged within the pockets at opposite sides of each slide may be viewed by merely turning the slide over upon itself.

In view of the foregoing description when considered in conjunction with the accompanying drawings it will be apparent that I have provided a highly novel, simple, and extremely useful index slide for index card systems that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new is:—

1. A cabinet having side guides, a follower slidably arranged within the cabinet along said guides, a panel arranged for slidable movement within the cabinet, and means for pivotally and swivelly connecting the inner end of the panel to said follower whereby the panel may be rotated and swung vertically when entirely disposed outwardly of the cabinet.

2. A cabinet having side guides, a follower slidably arranged within the cabinet along said guides, a panel arranged for slidable movement within the cabinet, and means for pivotally and swivelly connecting the inner end of the panel to said follower whereby the panel may be rotated and swung vertically when entirely disposed outwardly of the cabinet, said slidable follower having means for abutment with the front wall of the cabinet to prevent casual displacement of the follower from the cabinet.

3. The combination of a cabinet, a follower arranged for horizontal sliding movement within the cabinet, a panel carrying indicia on both sides thereof arranged for slidable movement within the cabinet and adapted to move into and out of the cabinet through the front wall thereof, a cross bar rotatably mounted on the forward end of the slidable follower, and a wivel connection between the inner end of the panel and the intermediate portion of the cross bar, whereby said panel may be rotated and swung vertically when the panel is disposed entirely outwardly of the cabinet.

4. The combination of a cabinet, a follower arranged for horizontal sliding movement within the cabinet, a panel carrying indicia on both sides thereof arranged for slidable movement within the cabinet and adapted to move into and out of the cabinet through the front wall thereof, a cross bar rotatably mounted on the forward end of the slidable follower, and a swivel connection between the inner end of the panel and the intermediate portion of the cross bar, whereby said panel may be rotated and swung vertically when the panel is disposed entirely outwardly of the cabinet, and means associated with the slidable follower for abutment with the front wall of the cabinet to prevent casual displacement of the slidable follower from the cabinet.

5. The combination of a cabinet, an index card receiving panel sildably mounted in the cabinet and adapted to pass through the front side of the cabinet, a follower for the panel slidable within the cabinet and capable of being partially projected through the front side of the cabinet, a cross bar having swivel connection to the inner end of the panel, and a detachable pivotal connection between the ends of the cross bar and the forward end of the follower, whereby the panel may be swung in a vertical plane when the panel is disposed entirely outwardly of the cabinet and the forward end portion of the follower projects beyond the front side of the cabinet.

6. The combination of a cabinet, an index card receiving panel slidably mounted in the cabinet and adapted to pass through the front side of the cabinet, a follower for the panel slidable within the cabinet and capable of being partially projected through the front side of the cabinet, a cross bar pivotally connected to the inner end of the panel, and a detachable pivotal connection between the ends of the cross bar and the forward end of the follower, whereby the panel may be swung in a vertical plane when the panel is disposed entirely outwardly of the cabinet and the forward end portion of the follower projects beyond the front side of the cabinet, said follower including means for engagement with the front wall of the cabinet to limit the forward sliding movement of the follower in the cabinet.

In testimony whereof I affix my signature.

HAL TURNER.